US006491981B1

(12) United States Patent
Guichard et al.

(10) Patent No.: US 6,491,981 B1
(45) Date of Patent: Dec. 10, 2002

(54) USE OF FUNCTIONALIZED SILICONE COMPOSITION FOR PRODUCING A HYDROPHOBIC AND/OR OIL-REPELLENT COATING AND/OR IMPREGNATION WITH LOW SURFACE ENERGY

(75) Inventors: Gérald Guichard, Givors (FR); Gérard Mignani, Lyons (FR); Philippe Olier, Lyons (FR)

(73) Assignee: Rhodia Chimie, Courbevoie (FR)

( * ) Notice: Subject to any disclaimer, the term of this patent is extended or adjusted under 35 U.S.C. 154(b) by 0 days.

(21) Appl. No.: 09/743,788

(22) PCT Filed: Jul. 19, 1999

(86) PCT No.: PCT/FR99/01761

§ 371 (c)(1),
(2), (4) Date: Feb. 20, 2001

(87) PCT Pub. No.: WO00/05315

PCT Pub. Date: Feb. 3, 2000

(30) Foreign Application Priority Data

Jul. 21, 1998 (FR) .............................................. 98 09438

(51) Int. Cl.[7] ................................................ B05D 3/02
(52) U.S. Cl. ............................ 427/387; 528/31; 528/42

(58) Field of Search ....................... 528/42, 31; 427/387

(56) References Cited

U.S. PATENT DOCUMENTS

| 5,385,999 A | | 1/1995 | D'Anvers et al. ............ 528/21 |
| 5,910,372 A | | 6/1999 | Griffin et al. ............... 428/429 |
| 6,184,329 B1 | * | 2/2001 | Jost et al. ..................... 528/15 |

FOREIGN PATENT DOCUMENTS

| AU | 707197 | 1/1997 |
| WO | 94/28053 | 12/1994 |

* cited by examiner

Primary Examiner—Margaret G. Moore
(74) Attorney, Agent, or Firm—Dennison, Schultz & Dougherty

(57) ABSTRACT

A functionalized silicone with perfluorinated polyorganosiloxanes (POS) $R_f$ is used to produce coatings with low surface energy and improved adherence to supports. The compositions include a group POS A bearing, per molecule, bis-perfluoromalonate grafts Gf, functional radicals Fa of the amine (HALS) $f_{a1}$, epoxy $f_{a2}$, (poly)ether $f_{a3}$, carboxy $f_{a4}$ type, and optionally alkyl groups $G_{alk}$. The invention is useful for producing soil release coatings for textiles.

18 Claims, No Drawings

USE OF FUNCTIONALIZED SILICONE COMPOSITION FOR PRODUCING A HYDROPHOBIC AND/OR OIL-REPELLENT COATING AND/OR IMPREGNATION WITH LOW SURFACE ENERGY

FIELD OF THE INVENTION

The field of the invention is that of formulations for the treatment of substrates for the purpose of conferring on them resistance to aqueous and fatty substances. More particularly, the invention relates to silicone compositions comprising perhalogenated, preferably perfluorinated, radicals which can be used in particular for the preparation of hydrophobic and/or oleophobic coatings and/or for carrying out hydrophobic and/or oleophobic impregnations of various substrates.

More particularly still, the invention relates to silicone compositions which can be employed as fluorinated finishing preparations in the textile field for rendering the treated fabrics impermeable and for contributing stain-resistant and/or soil-resistant properties, combined with ease of washing. Such properties are also advantageous for other fields of application than the textile field. Mention may be made, for example, of the construction field, in which coatings, paints, coats or other glazings of a water- and oil-repellent nature are employed which render resistant surfaces which are non-adhesive with respect to ice, biological fouling of the type of that which becomes attached to boat hulls, or graffiti, or with respect to other undesirable contaminants.

DESCRIPTION OF RELATED ART

Silicone oils grafted with fluorinated units can also be used as lubricant, as specific antiadhesive agent with respect to certain adhesives (silicones with a high adhesive power), as grease-resistant agent or alternatively as antifoaming agent. They can also be formulated with various thickeners in order to form mastics or any other leakproofing and/or pointing material.

The present invention is targeted at the use of functionalized silicone compositions comprising linear or cyclic perhalogenated, preferably perfluorinated, polyorganosiloxanes exhibiting at least one silicon atom substituted by at least one perfluorinated radical Rf for the preparation of hydrophobic and/or oleophobic coatings and/or for carrying out hydrophobic and/or oleophobic impregnations with a low surface energy (for example, soil-resistant coating on textile substrates).

The invention also comprises a selection of silicone compositions with given perfluorinated functional groups and with other specific functional groups, in particular for attachment.

The present invention also relates to a process for the preparation of a hydrophobic and/or oleophobic coating and/or for carrying out a hydrophobic and/or oleophobic impregnation employing said composition.

Finally, the invention is targeted at precursors of coatings, coats, paints or other glazings comprising this composition.

The role of halogens and in particular of fluorine and of the carbon/fluorine bond in contributing specific properties to organic polymer systems is a notion which is well known in polymer chemistry. In particular, it is known that fluorination and more specifically the introduction of perfluorinated units into polymers leads to a decrease in the surface energies, an improvement in the thermal and chemical stability and an improvement in the hydrophobicity, organophobicity and oleophobicity properties. It is thus known that, in order to resist aqueous and fatty substances, a coating must comprise a high density of perfluorinated end groups Rf at the surface. Since the 1970s, this type of functionalization by perfluorination has been applied to silicone polymers, in particular of the linear or cyclic, preferably linear, polyorganosiloxane (POS) type.

For more details on these fluorosilicones, reference may be made to the article by Ogden R. Pierce entitled "Fluorosilicons", 1970, John Wiley & Sons Inc., pages 1 to 15.

A first known strategy for the industrial synthesis of silicones comprising perfluorinated units consists essentially in "hydrosilylating" a dihalohydroorganosilane, such as MeHSiCl$_2$ (Me=methyl), with an unsaturated compound carrying a perfluorinated unit with the general formula: CH$_2$=CH—Rf (Rf=perfluorinated unit). The addition of the silane to this olefin results in a perfluorinated dihaloorganosilane, which can be hydrolyzed so as to produce a functionalized silicone, which may, for example, be a cyclic tetramer. It is possible to subject the latter to a redistribution in order to obtain a perfluorinated linear polyorganosiloxane (POS). The hydrosilylation reactions which are involved in this type of synthesis and which employ various combinations of silicone hybrids and of perfluorinated olefins are known to be catalyzed by selected metal compounds and in particular certain metals from Group VIII, such as platinum. Pt/Sn complexes have thus been employed as hydrosilylation catalyst—cf. U.S. Pat. No. 4,089,882 (Shinetsu). This synthetic strategy appears to be relatively complex and therefore expensive.

For the sake of industrial simplification, a second synthetic strategy has been proposed based on the direct hydrosilylation of a silicone comprising an SiH unit using α-fluorinated olefin, e.g. of the CH$_2$=CH—Rf type, this perfluorinated unit Rf being directly attached to the olefinic CH via a carbon atom carrying at least one fluorine atom. Here again, various metal catalysts from Group VIII, in particular based on platinum, are used in the context of this hydrosilylation reaction. However, it turned out that these catalysts did not make it possible to achieve very high yields. In particular, conventional platinum-based industrial hydrosilylation catalysts (for example of the Karstedt type) are not very efficient. In addition, it could be observed that large amounts of by-product are generated, this very clearly being at the expense of the perfluorination of the silicones.

In U.S. Pat. No. 5,233,071, it is these linking units which are employed. They originate from the hydrosilylation of α-olefins. However, in order to overcome the shortcomings of the hydrosilylation catalysts used previously, the process disclosed in this patent resorts to cobalt-based organometallic complexes [(Co$_2$CO$_8$.Co$_2$CO$_6$) (PR$_3$)$_3$ with R=alkyl, aryl]. It is apparent that such a technical proposal is unsatisfactory, as the reaction times obtained are of the order of a few days and it is essential to use a large amount of catalyst (1–2%), which is particularly penalizing to the economics of the process.

A not insignificant disadvantage of these cobalt-based complexes is that they catalyze other reactions than the hydrosilylation. In particular, they can participate in polymerization processes by cleavage of epoxy rings. This lack of specificity is a particular hindrance. In addition, these catalysts are not industrially usable.

U.S. Pat. No. 5,348,769 discloses linear or cyclic polyorganosiloxanes comprising D siloxyl units substituted by a first perfluorinated functional unit of formula —R³ZRf and other D siloxyl units carrying a second type of functional unit of the etherhydroxyl or alkylhydroxyl type. The linking unit or the bridge connecting Si to Rf of the first perfluorinated functional unit is composed in particular of: $(CH_2)_xZ$, with x=2, 3 or 4 and Z=NHCO, $NHSO_2$, $O_2C$, $O_3S$, $OCH_2CH_3$, $NHCH_2CH_2$ or $CH_2CHOHCH_2$. The catalyst employed is preferably chloroplatinic acid.

Apart from these linking units, the precursors of which are perfluoroalkylated α-olefins of formula $CH_2$=CH—Rf, the prior technical literature also discloses bridges for which the olefinic precursors are of the $CH_2$=CH—L—Rf type; the chemical bond between L and Rf being an ester bond. The latter results from the reaction of a carboxyl functional group with a perhalogenated alcohol, preferably a perfluorinated alcohol. And generally, said carboxyl functional group is the product of the hydrolysis of an acid anhydride.

Thus it is that PCT Patent Application WO 94/12561 discloses POSs grafted with fluorinated units solely at the α- and ω-positions at the ends of the silicone chains. These α,ω-(alkyl ester perfluorinated) POSs do not exhibit optimum properties as regards the lowering in surface tension and the oleophobicity and the hydrophobicity.

European Patent Application No. 0 640 644 discloses, for its part, perfluorinated (Rf) silicone derivatives which can be used in cosmetic formulations. These perfluorinated silicone derivatives are characterized by D siloxyl units carrying perfluorinated grafts of three different types, namely:

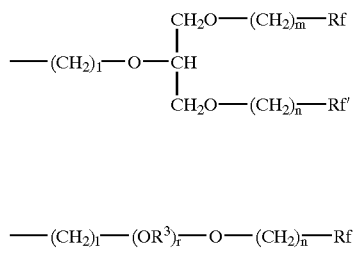
(1)

(2)

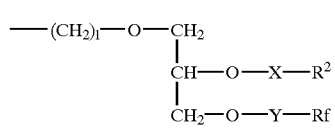
(3)

with $R^2$ and $R^3$=alkyl, e.g. $CH_3$;

$2 \leq l \leq 16$, e.g. l=3; $1 \leq m, n \leq 6$; $\leq p \leq 200$; $0 \leq r \leq 50$;

X and Y=single bond, —CO— or $C_1$–$C_6$ alkylene.

These perfluorinated grafts (1) to (3) have in common the presence of ether bonds in the linking unit connecting the perfluorinated radical Rf to the silicon.

In order to overcome the absence of chemically stable perfluorinated POSs which can be obtained simply and economically, the Applicant Company has already provided novel linear or cyclic perfluorinated POSs corresponding to these specifications and comprising perfluorinated grafts Gf of formula: $C_mH_{2m}$—Rf, in which $m \geq 2$ and Rf=perfluorinated residues; and optionally one or more other perfluorinated or nonperfluorinated grafts Gf with a first condition according to which at least 60% of the grafts Gf are perfluorinated and a second condition according to which, in the case where m=2, at least one other graft Gf is then provided which is different in nature from that defined in the above formula.

These POSs can correspond, e.g., to the following formula:

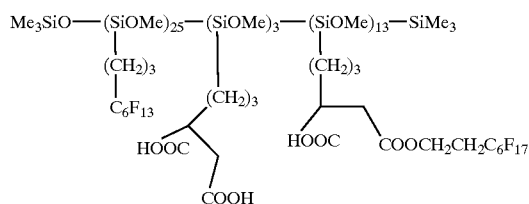

These POSs can be used in the formulation of lubricant antifoaming agents, of antiadhesive agents, of agents for lowering surface tension, of soil-resistant agents, of oleophobic and/or hydrophobic agents or of starting materials for the preparation of elastomers or of films which are resistant to chemical attacks and to solvents. These novel perfluorinated POSs and their production and their application are disclosed in French Patent Application No. 95 09 269.

French Patent Application No. 95 09 268 is a sister application of FR 95 09 269. This Application No. 95 09 268 discloses polyfunctional perfluorinated POSs comprising, on the one hand, fluorinated side grafts (Gf) resulting from the hydrosilylation of perfluorinated olefins by SiH groups and exhibiting alkyl and/or alkyl ester linking units, with the exception of ethers, and, on the other hand, other nonperfluorinated functional units (E) which can in particular be of the propylmalonyl type in the COOR or anhydride form or of the amine type.

These POSs can, e.g., be those of following formula:

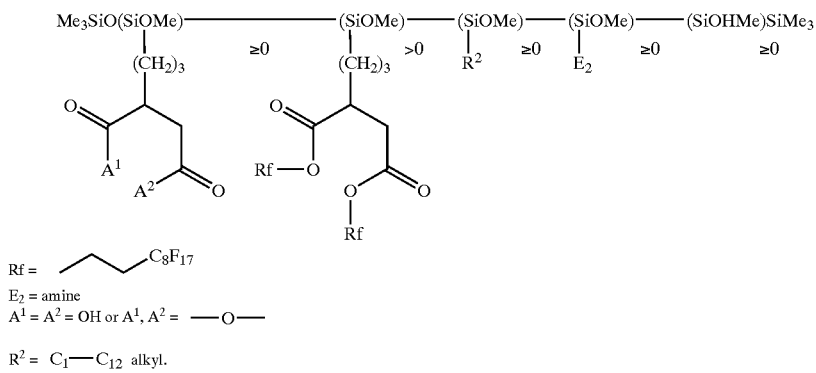

Rf = ⌒⌒C₈F₁₇
E₂ = amine
A¹ = A² = OH or A¹, A² = —O—

R² = C₁—C₁₂ alkyl.

These POSs have the same applications as those according to FR 95 09 629, including in particular textile soil resistance.

SUMMARY OF THE INVENTION

One of the essential objectives of the present invention is to select perfluorinated silicone compositions also possessing other functionalities very particularly suited to the preparation of hydrophobic and/or oleophobic coatings with a low surface energy (for example, soil-resistant coatings on textile substrates).

Another essential objective of the present invention is to improve the perfluorosilicone (co)polymers according to the prior art and in particular according to FR 95 09 269 and FR 95 09 268:

- by providing them with better properties of attachment to the substrates, as regards the coating and/or impregnation applications,
- and by improving their hydrophobic and oleophobic natures and their resistance to washing, to wear and to abrasion, in short by increasing their lifetime.

This is because it is important for perfluorosilicone systems to be insensitive to external attacks (solubilization/extraction due to washing or to the action of abrasives), so as to retain their desired properties of lowering the surface tension, which is the source of their impermeability, stain-resistance and soil-resistance functions. This is because the abovementioned external attacks have the direct repercussion of removing the surface perfluoro groups. In point of fact, it was seen above that this surface location of said Rf groups is essential for their effectiveness.

Having been set these objectives, among others, the Inventors have had the credit of demonstrating, after lengthy and laborious studies and experiments and in an entirely surprising and unexpected way:

- on the one hand, that it is possible, advantageously, to use certain specific perfluorinated and functionalized silicone compositions for preparing hydrophobic and/or oleophobic coatings with a low surface energy (for example, soil-resistant coatings on textile substrates),
- and, on the other hand, that it is possible to achieve the improvement by providing a silicone system comprising POSs carrying:
  - firstly, perhalogenated, preferably perfluorinated, grafts (Gf) carefully selected from perfluorinated esters of dicarboxylic acids capable of forming anhydrides (e.g. maleic acid); these Gf grafts being described as bifid Rf grafts;
  - secondly, attaching functional groups of HALS, epoxy or polyether type;
  - and optionally, thirdly, alkyl groups exhibiting more than 12 carbon atoms in substitution for a portion of the fluorinated grafts Gf.

It follows that the present invention relates first of all to the use of a silicone composition of the type of those comprising at least one perfluorinated POS A and optionally at least one functional additive B for the preparation of hydrophobic and/or oleophobic coatings and/or for carrying out hydrophobic and/or oleophobic impregnations with a low surface energy, characterized in that the POS A carries, per molecule:

one or more perfluorinated Gf grafts, which are identical to or different from one another, of formula:

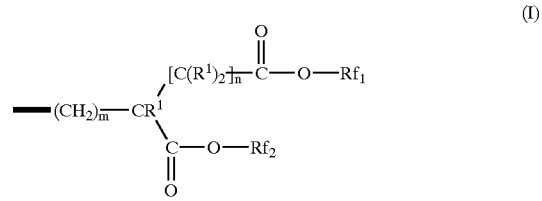

(I)

in which:
the $R^1$ radicals independently represent hydrogen or a $C_1$–$C_6$ alkyl $Rf_1$ and $Rf_2$ are perhalogenated, preferably perfluorinated, radicals and more preferably still a linear or branched perfluoroalkyl radical of formula:

—$C_qF_{2q}$—$CF_3$ with $q > 0$; (II)

or

—$C_qF_{2q}$—H with $q > 1$; (III)

m=1 to 10;
n=0 to 4;

one or more attaching functional radicals $F_a$, which are identical to or different from one another, chosen from the group of radicals carrying at least one amine functional group $f_{a1}$, preferably amine composed of a sterically hindered piperidinyl group and its derivatives; and/or at least one epoxy functional group $f_{a2}$ and/or at least one (poly)ether functional group $f_{a3}$; and/or at least one carboxyl functional group $f_{a4}$;

and optionally one or more linear or branched (preferably linear) alkyl groups $G_{alk}$ comprising at least 6, preferably at least 8 and more preferably still between 10 and 20 carbon atoms.

It should be pointed out, as key for all the formulae given in the present description, that the free valencies represented in bold—are those which are attached directly or indirectly to the silicon of the molecule under consideration.

The term "low surface energy" is understood to mean, in accordance with the invention, values of total $\gamma_s \leq 15$ mJ/m$^2$.

By choosing to use POSs substituted by Gf perfluorinated grafts of formula I of bisRf or Rf bifid type, by amine (preferably of the hindered piperidinyl type, e.g.: HALS), epoxy, polyether or carboxyl attaching functional groups $f_a$, and optionally by long alkyls in place of the Gfs, the Inventors introduce an entirely satisfactory solution to the problem of the attachment of hydrophobic and oleophobic fluorinated coatings to substrates and of the increase in the resistance to aqueous and fatty substances. This makes it possible also to increase the durability of the effectiveness of the surface fluorine.

Furthermore, without wishing to be bound by theory, it would seem that the bifid structure of the Gf grafts selected according to the invention contributes to the achievement of an anisotropic arrangement, which promotes the hydrophobic and oleophobic effect of the perfluorinated units.

Within the meaning of the invention, the $f_{a4}$ functional groups of carboxyl type are those corresponding to —COOR with R=hydrocarbonaceous radical or to COO$^-$X$^+$ with X$^+$=alkali metal or ammonium cation.

DETAILED DESCRIPTION OF THE INVENTION

Still as regards the Gf perfluorinated grafts, it should be noted that, according to the invention, the monovalent residues Rf$_1$ and Rf$_2$ in the formula I preferably correspond to —C$_p$F$_{2p}$—CF$_3$, with p between 3 and 20, preferably between 5 and 20 and more preferably still between 7 and 10.

In practice, it is also possible to employ, for example, mixtures of Rfs for which the indices p are equal to 7, 8 or 9.

According to an alternative form, the POS A carries, per molecule:

one or more perfluorinated Gfh grafts, which are identical to or different from one another, of formula (I.1):

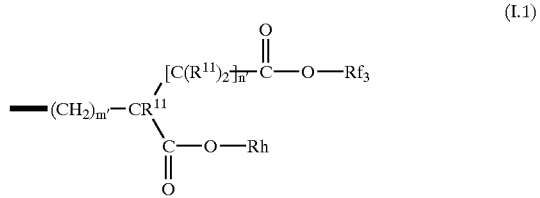

in which:

R$^{11}$, Rf$_3$, m' and n' correspond to the same definitions as those given above for R$^1$, Rf$_1$, m and n;

Rh is a linear or branched, preferably linear, C$_6$–C$_{40}$ and more preferably C$_6$–C$_{20}$ alkyl radical.

As regards the attaching functional radicals F$_a$ of the POSs comprising Gf, indeed even Gfh, perfluorinated grafts used in accordance with the invention, these are hydrocarbonaceous radicals, identical to or different from one another, which can comprise one or more Hals, epoxy, ether or carboxyl functional groups $f_{a1-4}$.

$F_a$ can, for example, be composed of an $f_{a1-4}$ functional group and of a linking unit which connects $f_{a1-4}$ to a silicon of the siloxane chain. The linking units can be alkylenes, such as ethylenes, propylenes, butylenes. Thus, the functional group $f_{a1}$=amine, preferably hindered piperidinyl of HALS type, can form an $F_a$ functional radical in combination with a divalent propylene linking unit, and likewise for $f_{a2}$=epoxy, $f_{a3}$ polyether or $f_{a4}$ carboxyl.

As regards these $f_{a4}$ functional groups of the carboxyl type, it may be envisaged, as an alternative form of the invention, that they are carried, in a molecule, by specific $f_{a4}$ functional radicals corresponding to the following formula (IV):

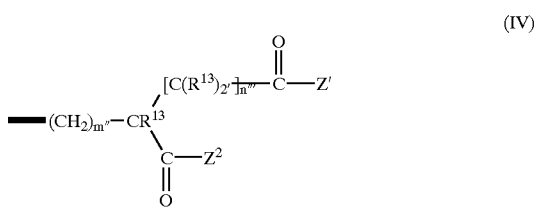

in which:

R$^{13}$, m''' and n''' correspond to the same definitions as those given above in the key to the formula (I.1) for R$^{11}$, m' and n' respectively;

Z$^1$ and Z$^2$ correspond to —OH or together form an —O— bridge.

These attaching functional radicals Fa contribute to the permanence of the hydrophobicity and oleophobicity properties. In particular, they improve the resistance to washing.

The interactions between the substrates (e.g. textiles) and Fa, which are the cause of such results, can, if appropriate, be promoted by a catalyst.

According to an advantageous form, the POSs A employed in the use which is a subject matter of the invention comprise only a single type of $f_{a1\ or\ 2\ or\ 3\ or\ 4}$ functional group. Although an assortment of different $f_a$S on the same POS A is not excluded, this single-$f_a$ alternative form is preferred for reasons of industrial simplification.

As regards the long alkyls $G_{alk}$ capable of forming pendant side groups for the POS A employed in the use according to the invention, it has appeared advantageous to choose them from alkylmalonate esters or analogous compounds.

It follows that the POS A advantageously carries, per molecule, one or more $G_{alk}$ group, which are identical to or different from one another, of formula (V):

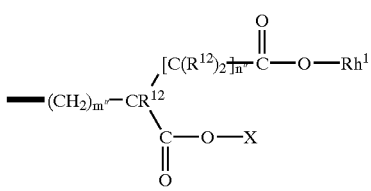
(V)

in which:
- $R^{12}$, m'', n'' and $Rh^1$ correspond to the same definitions as those given above for $R^{11}$, m', n' and Rh,
- X corresponds to an $Rh^2$ radical corresponding to the same definition as $Rh^1$ or to hydrogen or alternatively to a hydrocarbonaceous radical other than $Rh^1$ and $Rh^2$.

The $G_{alk}$ grafts of formula V in which $Rh^1$ and X are both long (e.g. $C_{12}$–$C_{20}$) alkyls are particularly preferred.

The POS A is preferably linear and comprises, in addition to the siloxyl units substituted by Gf, $F_a$ and $G_{alk}$, D siloxyl units of Si—H type and/or of —$(R^2)_2$SiO— type.

Thus, in the case where the final application targeted is the soil-resistant coating for substrates (e.g. textiles), it is desirable for free D siloxyl units to exist.

According to an alternative form, the end M siloxyl units of the linear POSs A can be substituted by at least one group chosen from: Gf, $F_a$ and $G_{alk}$.

Preferred POSs among which the POS A can be selected are in practice linear random POSs which can optionally exhibit up to 50% by weight of branchings (units other than D siloxyl units), cyclic polymers or three-dimensional polymers (resins comprising T and/or Q siloxyl units). (polymethylsiloxanes-polymethylhydrosiloxanes).

Thus, in a preferred embodiment of the invention, the composition comprises one or more POSs A corresponding to the following formula (VI):

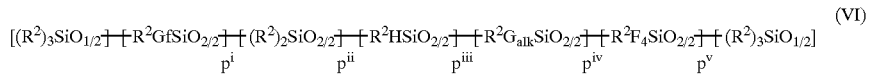
(VI)

with
- Gf and $F_a$ representing, independently and respectively, perfluorinated grafts and radicals carrying $F_a$ functional groups, as defined above;
- $R^2$, which are identical to or different from one another, =methyl, propyl or butyl;
- $G_{alk}$, which are identical to or different from one another, =linear or branched alkyl, preferably $C_6$–$C_{40}$ alkyl and more preferably $C_6$–$C_{20}$ alkyl;
- $0<p^i$, preferably $1 \leq p^i \leq 100$;
- $0 \leq p^{ii}$, preferably $0 \leq p^{ii} \leq 500$;
- $0 \leq p^{iii}$, preferably $0 \leq p^{iii} \leq 10$;
- $0 \leq p^{iv}$, preferably $0 \leq p^{iv} \leq 100$;
- $0<p^v$, preferably $1 \leq p^v \leq 100$;
- $\Sigma p^{i\ to\ v}+2=5$ to 600, preferably 10 to 400.

In practice, it is possible to have:
- $1 \leq p^i \leq 50$;
- $50 \leq p^{ii} \leq 300$;
- $0 \leq p^{iii} \leq 5$;
- $0 \leq p^{iv} \leq 50$;
- $1 \leq p^v \leq 50$;
- $\Sigma p^{i\ to\ v}+2=5$ to 300.

According to an advantageous alternative form, the POS A used according to the invention comprises, in addition to the M and D siloxyl units, T and optionally Q siloxyl units.

The POS A of the composition according to the invention is also novel and advantageous because of the features relating to its production. It is preferably obtained from POSs chosen from polyalkylhydrosiloxanes, the SiH units of these POSs subsequently being at least partially used for the hydrosilylation of olefinic precursors of all or a portion of the Gf, Fa and optionally $G_{alk}$ grafts; in the presence of an effective amount of metal hydrosilylation catalyst, preferably based on platinum.

In the cases where first of all only a portion of the Gf, Fa or indeed even $G_{alk}$ grafts are grafted by hydrosilylation, the introduction of the missing part perhaps carried out in one or more graftings involving any chemical reaction mechanism.

This functionalization by segments can also be acceptable for the other Fr, Frc or alkyl substituents of the POS A.

In addition to the POS A, the perfluorosilicone composition employed in the context of the use according to the invention can comprise one or more functional additives B, such as surfactants, fillers, plasticizers, viscosifying agents, fluidizers, stabilizers, biocides or others.

As regards more specifically the soil-resistant coatings and/or impregnations for textile substrates application, the functional additives B are, for example:
- thermocondensable resins for improving the dimensional strength or the behavior when washed or for introducing a degree of stiffness;
- softeners which give a soft feel, which improve the behavior in the clothing industry and which favor the mechanical treatments (treatment with emery, napping, calendering);
- antistatic agents which facilitate the flow of the electrostatic charges accumulated by the textiles during the various drying or polymerization operations and the like;
- flame-retardant agents which decrease the flammability and prevent the propagation of the flame;
- fungicidal and bactericidal agents which protect from molds and rots;
- products which are commonly denoted under the name of extenders, which can, for example, be melamine resins modified by fatty acids or mixtures of waxes and of zirconium salts and which, in combination with fluororesins, substantially improve, in some cases, the properties thereof.

Insofar as it has been seen above that it is possible to envisage, according to a secondary alternative form, catalyzing the reactions which make possible bonding between the attaching functional groups $F_{a1\ to\ 4}$ of the $F_a$ radicals of the POS A and the substrate on which above said silicone composition can be applied, the silicone composition can optionally comprise at least one catalyst C capable of promoting the reactions under consideration.

According to another of its subject matters, the present invention relates to perhalosilicone, preferably perfluorosilicone, compositions as novel industrial products.

These novel compositions can in particular be employed in the use according to the invention.

A first family of these novel compositions is composed of those comprising at least one POS A of the type of that defined above, pages 7, line 10 to page 8, line 5, apart from the difference that $F_a$ corresponds to attaching functional radicals, which are identical to or different from one another, chosen from the group of radicals carrying at least one amine functional group $F_{a1}$, preferably sterically hindered piperidinyl, e.g.: HALS, and/or at least one epoxy functional group $F_{a2}$ and/or at least one polyether functional group $F_{a3}$, with the exclusion of the carboxyl functional groups $F_{a4}$.

A second family of these novel compositions is composed of those comprising at least one POS A of the type of that defined above, page 7, line 10, page 8, line 5, apart from the difference that $F_a$ corresponds to attaching functional radicals, which are identical to or different from one another, chosen from the group of radicals carrying at least one carboxyl functional group $F_{a4}$ and that the POS A comprises, per molecule, at least one $G_{alk}$ group of formula V as defined above in which X=Rh$_2$.

The novel compositions belonging to these two families can, following the example of all those employed in the context of the use according to the invention and defined above, optionally comprise functional additives B and/or at least one catalyst C as described above.

By virtue of the particular nature of the perfluorinated grafts $G_f$, of the attaching functional radicals Fa and of the optional grafts $G_{alk}$ of the POS A, the compositions according to the invention make it possible to confer, in a lasting manner, a low surface tension on the solids to which they are applied or in which they are present. These compositions thus provide oleo- and/or hydrophobicity properties which are stable over time. This result is particularly advantageous and attractive for applications of the coating, finishing or impregnation type:

for textiles, for buildings (coats, paints, graffiti-resistant paints, or glazes), or for any other article to be protected against stains and dirt and to be rendered impermeable (e.g. antifouling paints for boats).

These fluorosilicone compositions according to the invention can also participate in the formulation of mastic, of pointing and leakproofing material, of lubricant, of antiadhesive agent, of antifoaming agent or of grease-resistant agent.

The lowering in the surface tension induced by the fluorosilicone compositions according to the invention, that is to say the oleo- and/or hydrophobicity properties, can be adjusted by controlling the proportions of D units grafted or not grafted by fluorinated and/or alkylated units. This corresponds to the variation in the indices $p^i$ to $p^v$ in the above formula (VI) of the POSs A.

Various functional additives D can be incorporated in the compositions of the invention according to the applications envisaged.

The compositions according to the invention are prepared by mixing the various constituents A and optionally B and/or C. Before being used or incorporated in operating formulations, these compositions can be in solution, in emulsion or in the form of a molten mass.

According to a characteristic of the invention, the POSs A according to the invention are obtained by hydrosilylation of olefinic precursors, comprising an end double bond (for example vinyl or allyl), of the various grafts or substituents envisaged for these POSs A, that is to say: Gf, Fa or $G_{alk}$.

These hydrosilylations are carried out, in a way known per se, in the presence of an effective amount of industrial metal catalyst chosen from nickel-, palladium- or platinum-based compounds, preferably platinum-based compounds. This can be, for example, a Karstedt catalyst advantageously employed in a small amount, e.g. of the order of 10 to 50 ppm with respect to the POS compounds under consideration, before hydrosilylation (SiH oil). Hydrosilylation is a simple technique well known to a person skilled in the art. The kinetics thereof are fast and hydrosilylation makes it possible to achieve particularly high yields and degrees of conversion of the SiH units. The hydrosilylation conditions are conventional and can thus be easily determined by a person skilled in the art.

In practice, the hydrosilylation takes place in as many phases as there exist different olefinic reactants. The reaction medium is stirred and brought to a temperature of between 50 and 150° C. The reaction takes place at atmospheric pressure and generally over a period of several hours. The degree of conversion of the SiH units is greater than 90% by number.

It has been seen that the grafting of a specific substituent, for example: Gf, Fa, or $G_{alk}$, can be broken down into several stages. The first of these stages is a hydrosilylation, by the SiH units of the POS, of a precursor of the substituent corresponding only to a portion of said substituent. To this first link, attached by hydrosilylation to the main chain of the POS, will subsequently be connected one or more other links or spacing compounds, until the graft or the substituent in its entirety is obtained.

The binding of the various links to one another can be carried out by various known chemical reaction mechanisms, e.g.: esterification, addition, substitution, and the like.

In the case of the Gf, Fa, or $G_{alk}$ grafts or radicals of formula I, I.1, IV, V or the like, it can be envisaged carrying out the grafting by first of all attaching to the POS, by hydrosilylation, a radical with one end comprising an ethylenic unsaturation and the other end exhibiting the two carboxyl functional groups in the form:

COOR', with R'=hydrocarbonaceous radical,

COO$^-$ . . . X$^+$, with X=alkali metal or ammonium cation.

These two carboxyl functional groups can also be provided in the anhydride form.

It is easy to react these carboxyl or anhydride reactive functional groups with interposed links or end links carrying the functionality or functionalities which it is desired to graft onto the POS. Thus, in the case where the operation has to be carried out on a first link comprising an anhydride end, it can be envisaged: subjecting at least a portion of the anhydride functional groups attached to the POS to hydrolysis, so as to generate free carboxyl ends, and subsequently esterifying at least a portion of said ends using reactants which make it possible to construct the graft in its entirety.

Mention may be made, among the POSs capable of being used as starting material for the preparation of the POSs A, of, by way of examples, linear POSs, such as polymethylhydrosiloxanes comprising from 10 to 100 D units of SiMeH or SiMeH and SiMe$_2$ type, or cyclic POSs such as tetramethylcyclosiloxane D'4.

The invention is also targeted, in another of these subject matters, at a process for the preparation of hydrophobic and/or oleophobic coatings and/or for carrying out hydrophobic and/or oleophobic impregnations on a substrate, this process being characterized in that it consists essentially:

in preparing and/or employing a composition as defined above, in applying this composition to a substrate, so as to obtain a film and/or to impregnate it, and in optionally evaporating the solvent, in the case where the composition is provided in the solution form.

The substrate under consideration can be a textile or any other solid material, such as, e.g.: metal, cement, concrete, wood, plastic, composite, and the like.

The applicational techniques come under the general knowledge of each specific field of use. The examples which follow give a few illustrations in this respect.

Industrial Application

The present invention also relates to the products or the formulations in which the composition to which it relates can be incorporated. They are, inter alia:

coating precursors, coats, paints (antifouling paints), glazes, lubricants, agents for lowering the surface tension, soil-resistant agents, antiadhesive agents, antifoaming agents, oleophobic and/or hydrophobic agents, starting materials for the preparation of elastomers or of films which are resistant to chemical attacks and to solvents, textile finishing preparations.

The films and/or coatings prepared from the composition as defined above also come within the scope of the invention.

EXAMPLES

Example 1

Preparation of Silicone Compositions
1) Monomer Synthesis

Example 1

Synthesis of the Malonic Allyldiester of Hexadecanol 968 g (4 mol) of hexadecanol (Aldrich), 440 g of diethyl allylmalonate (2.2 mol) and 7.04 g of butyl titanate are introduced into a 2,000 cc reactor. The reaction mass is brought to 130° C. in order to remove the ethanol formed during the reaction. After reacting for 72 h, 95% of the expected ethanol has been removed (174.5 g) and the product is recovered by precipitating from methanol. NMR analysis confirms the purity of the product (cf. Example IX, EP No. 96 420 251.9). 2) Polymers Synthesis The reaction is monitored by volumetric determination of the SiHs and the disappearance by IR of the peaks at 2,150 cm$^{-1}$ corresponding to the SiH functional group and the peaks at 3,085 cm$^{-1}$ and 1,645 cm$^{-1}$ corresponding to the unsaturations.

Example 2

101.2 g of 1,2-dimethoxyethane (Prolabo) are introduced into a 500 cc reactor and and 3.7 mg of Pt are added in the form of an organometallic complex comprising 11.2% of platinum.

The temperature is brought to 90° C. and 29.64 g (0.05 mol) of the hydrocarbonaceous diester of example 1 (in the molten form, θ=60° C.) and 88.3 g of a fluid comprising SiH assaying 2.55 mol of SiH functional groups/kg (0.225 mol of SiH functional groups) with the formula: $MD_{50}D'_{50}M$ [M= $(Me)_3SiO_{1/4}$-/D=$(Me)_2SiO_{2/4}$/-D'=$MeHSiO_{2/4}$] are run in simultaneously over 1 hour.

After reacting for 3 hours, IR quantitative determination indicates that the unsaturations have disappeared and 84.6 g (0.075 mol) of the perfluorinated diester of diethyl allylmalonate (in the molten form, θ=60° C.) are run in over 30 minutes. After reacting for 16 hours, IR quantitative determination indicates that the unsaturations have disappeared and 19.7 g of 4-allyloxy-2,2,6,6-tetramethylpiperidine (0.1 mol) are added. After reaction for a total of 20 h, the degree of conversion of the SiH units is 95%.

The product is recovered by precipitating from methanol and is dried under vacuum in an oven at ambient temperature for 48 h.

Material balance=92%.

The product obtained is as follows:

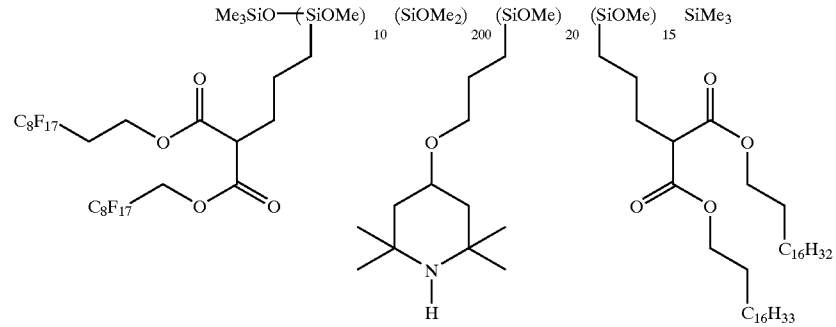

Example 3

13.4 g of toluene (Prolabo) are introduced into a 150 cc reactor. Heating is carried out to 90° C. and 1.2 mg of Pt in the form of an organometallic complex comprising 11.2% of platinum are added.

A solution composed of 40 g of toluene (Prolabo), of 54 g (0.052 mol) of the perfluorinated diester of diethyl allylmalonate and 20 g of fluid comprising SiH of example 2 assaying 2.55 mol of SiH functional groups/kg (0.05 mol of SiH functional groups) is run in over 3 hours.

After reacting for 4 h 30, the degree of conversion of SiH units is 99.5%.

The product is recovered by precipitating from methanol and is dried under vacuum in an oven at ambient temperature for 48 h.

Material balance=91.8%.

The product obtained is as follows:

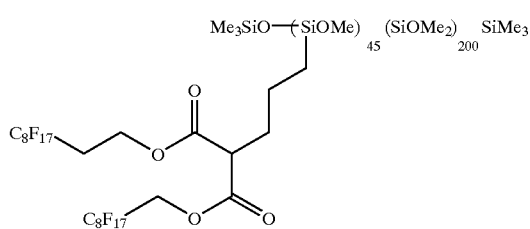

Example 4

70 g of hexamethyldisiloxane are introduced into a 500 cc reactor. Heating is carried out to 90° C. and 19 mg of Pt in the form of an organometallic complex comprising 11.2% of platinum are added.

A solution composed of 100 g of hexamethyldisiloxane, of 129.5 g (0.125 mol) of the perfluorinated diester of diethyl allylmalonate and and 82.9 g of a fluid comprising SiH assaying 1.64 mol of SiH functional group/kg (0.135 mol of SiH functional groups which is prepared as described in example 2) is run in over 3 hours. After reacting for 8 h, the degree of conversion of the SiH units is 92.6% and 1.98 g of 4-allyloxy-2,2,6,6-tetramethylpiperidine (0.01 mol) are added. After reacting for a total of 12 h, the degree of conversion of the SiH units by IR is 100%.

The product is recovered by devolatilization (3 h, 130° C., 2 mbar).

Material balance=95.7%.

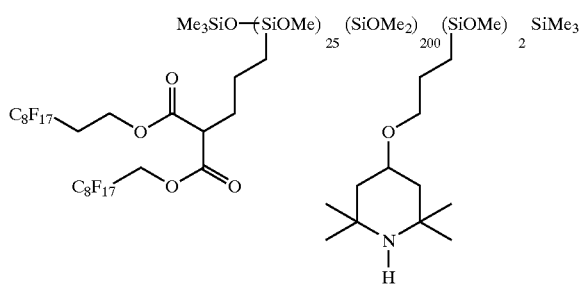

Example 5

30 g of hexamethyldisiloxane are introduced into a 100 cc reactor and 0.9 mg of Pt in the form of an organometallic complex comprising 11.2% of platinum is added.

The temperature is brought to 90° C. and 25.07 g (0.04 mol) of the perfluorinated monoester of diethyl allylmalonate and 12.7 g of a fluid comprising SiH assaying 3.92 mol of SiH functional groups/kg (0.049 mol of SiH functional groups) prepared as described in example 2 are run in simultaneously over 1 h.

After reacting for 1 hour, the degree of conversion of the SiH units is 72.5% and 3.94 g (0.02 mol) of 4-allyloxy-2,2,6,6-tetramethylpiperidine are run in over 10 minutes. After reacting for a total of 8 h, the degree of conversion of the SiH units is 100%. The product is recovered by devolatilization (5 h, 150° C., 5 mbar).

Material balance=96%

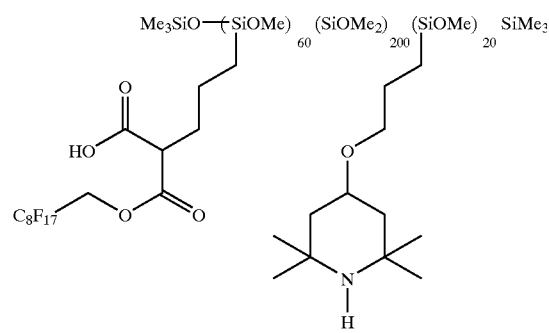

Example 6

40 g of toluene (Prolabo) are introduced into a 250 cc reactor and 2.8 mg of Pt in the form of an organometallic complex comprising 11.2% of platinum are added.

The temperature is brought to 90° C. and 114.6 g (0.194 mol) of the hydrocarbonaceous diester of example 1 (in the molten form, θ=60° C.) and 17.52 g of a fluid comprising SiH assaying 15.8 mol of SiH functional groups/kg (0.276 mol of SiH functional groups) prepared as described in example 2 are run in simultaneously over 30 minutes.

After reacting for 19 hours, IR quantitative determination indicates that the unsaturations have disappeared and 62.3 g (0.055 mol) of the perfluorinated diester of diethyl allylmalonate (in the molten form, θ=60° C.) are run in over 30 minutes. After reacting for 36 hours, IR quantitative determination indicates that the unsaturations have disappeared and 5.42 g of 4-allyloxy-2,2,6,6-tetramethylpiperidine (0.0297 mol) and 2.8 mg of Pt are added. After reacting for a total of 192 h, the degree of conversion of SiH units is 98.8%.

The product is recovered by devolatilization (8 h, 160° C., 9 mbar).

Material balance=80%.

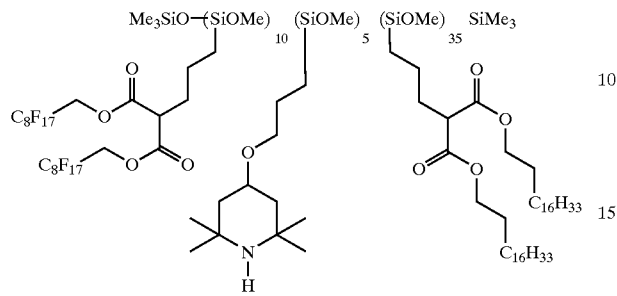

Example 7

55 g of toluene (Prolabo) are introduced into a 250 cc reactor and 1.8 mg of Pt are added in the form of an organometallic complex comprising 11.2% of platinum. The temperature is brought to 90° C and 22.8 g (0.136 mol) of 1-dodecene (Aldrich) and 17.6 g of a fluid comprising SiH assaying 15.8 mol of SiH functional groups/kg (0.279 mol of SiH functional groups) prepared as described in example 2 are run in simultaneously over 50 minutes.

After reacting for 4 hours, the degree of conversion of the SiH units is 55% and 54.7 g (0.109 mol) of the allyl ether of heptadecafluorodecanol are run in over 30 minutes. After reacting for 15 hours, the degree of conversion of the SiH units is 86% and 5.45 g of 4-allyloxy-2,2,6,6-tetramethylpiperidine (0.0297 mol) are added. After reacting for a total of 51 h, the degree of conversion of the SiH units is 98.3%.

The product is recovered by devolatilization (4 h, 140° C., 3 mbar).

Material balance=74.8%.

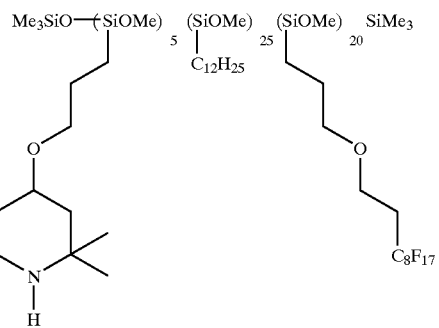

Evaluation of the Performances

The performances are evaluated from solutions of polymers in isopropyl acetate according to the standardized AATCC 118 (Oil Repellency-OR-) and EN 24920 (Spray Test) tests.

3.1 Application to Polyester/cotton Fabric at 20 g/l in Solution in Isopropyl Acetate The results obtained are given in Table 1 below.

TABLE 1

| | | Spray Test | | | | | OR | | | | |
|---|---|---|---|---|---|---|---|---|---|---|---|
| Examples | % fluorine | Initial | 1 wash | 1 wash + iron | 5 wash | 5 wash + iron | Initial | 1 wash | 1 wash + iron | 5 wash | 5 wash + iron |
| 2 | 22 | 80 | 70 | 70 | 50 | 50 | 5 | 5 | 4 | 4 | 4 |
| 3 | 45 | 70 | 50 | 50 | 0 | 0 | 0 | 0 | 0 | 0 | 0 |
| 4 | 38 | 70 | 70 | 70 | 50 | 70 | 5 | 5 | 5 | 1 | 3 |
| 5 | 31.9 | 70 | 50 | 50 | 0 | 50 | 3 | 1 | 1 | 0 | 0 |
| 6 | 19.8 | 100 | 50 | 90 | 0 | 70 | 3 | 3 | 2 | 0 | 0 |
| 7 | 35.5 | 70 | 0 | 0 | 0 | 0 | 0 | 0 | 0 | 0 | 0 |

Key: iron = ironing – wash = washing.

The properties cannot be rendered permanent without interactions with the substrate (Example 3) despite a high fluorine content.

The presence of a perfluorinated diester linking unit also makes it possible to obtain properties which are substantially superior to those obtained with polymers based on perfluorinated allyl ether (Example 7) or on monoperfluorinated linking unit (Example 5), while the fluorine contents are lower (Examples 2 and 6).

The presence or absence of hydrocarbonaceous functional groups makes it possible to vary the oleophobic nature or the hydrophobic of the polymer (Example 6 and 4).

Application as an Emulsion at 20 g/l to Polyester Cotton

The results obtained are given in Table 2 below.

TABLE 2

| Examples | Solids content % | % fluorine | Spray Test | | | OR | | |
|---|---|---|---|---|---|---|---|---|
| | | | Initial | 5 wash | 5 wash + iron | Initial | 5 wash | 5 wash + iron |
| 2 | 15 | 22 | 80 | 70 | 70 | 5 | 5 | 5 |
| 3 | | 45 | 70 | 50 | 50 | 3 | 0 | 0 |
| 4 | | 38 | 80 | 70 | 70 | 5 | 4 | 5 |
| 503* | | | 100 | 80 | 100 | 6 | 1 | 5 |
| FC251** | | | 100 | 70 | 80 | 5 | 1 | 2 |

*503 = Foraperle ® 503 from Atochem
**FC251 = Scotchguard ® from 3M.

4) Evaluation of Other Polymers
4.1. Preparation of POS A Polymers Substituted by Bifid Gfs and Fas=HALS in the Same Way as in Example 5
4.2. Oil Repellency (OR) and Water Repellency (WR) Tests in Various Solvents The OR (AATCC 118 standard) and WR (ISO 4920 standard) tests are carried out as follows:

deposition of 700 ppm of fluorine (impregnation of a circular sample of polyamide carpet weighing 15 g) from various solutions of POS A comprising Gf grafts and comprising Fa=HALS, drying for 6 min at 80° C., heat treatment for 4 min at 140° C.

4.3. Results

The results are given in Table 3 below.

TABLE 3

| Ex. No. | POS A | Solvents | OR | WR |
|---|---|---|---|---|
| 8 Comparative | $Me_3SiO(SiMe_2O)_{200}(SiMeO)_{25}(SiOMe)_{20}SiMe_3$ with $C_8H_{17}$ and HALS piperidine grafts | MIBK Methyl isobutyl ketone | 0 | 0 |
| 8 | $Me_3SiO(SiMe_2O)_{220}(SiMeO)_5(SiMeO)_{20}SiMe_3$ with $C_8F_{17}$/$C_8H_{17}$ malonate and HALS piperidine grafts | MIBK | 4 | 3 |

TABLE 3-continued
| Ex. No. | POS A | Solvents | OR | WR |
|---|---|---|---|---|
| 9 | Me$_3$SiO(SiMe$_2$O)$_{200}$(SiMeO)$_{25}$(SiMeO)$_{20}$SiMe$_3$ 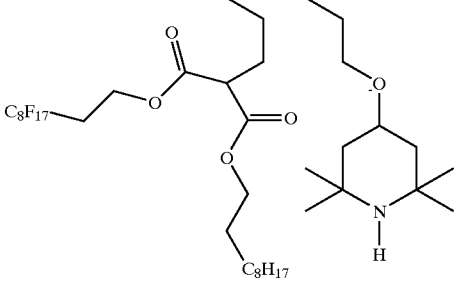 | MIBK | 5 | 7 |
| 10 | Me$_3$SiO(SiMe$_2$O)$_{200}$(SiMeO)$_{25}$(SiMeO)$_{20}$SiMe$_3$ 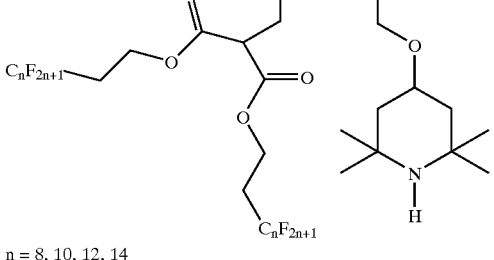<br>n = 8, 10, 12, 14<br>mean = 8.5 | MIBK | 6 | 7 |
| 11 | Me$_3$SiO(SiMe$_2$O)$_{200}$(SiMeO)$_{25}$(SiMeO)$_{20}$SiMe$_3$ 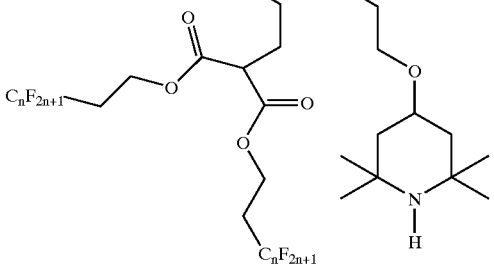<br>n = 8, 10, 12, 14<br>mean = 10 | MIBK | 5 | 7 |
| 12 | Me$_3$SiO(SiMe$_2$O)$_{200}$(SiMeO)$_{25}$(SiMeO)$_{20}$SiM 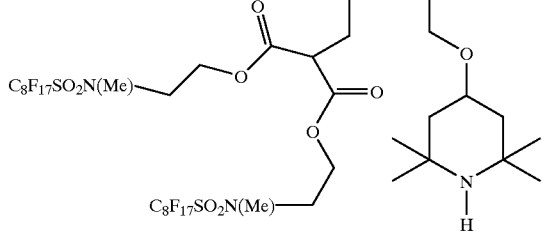 | MIBK | 6 | 7 |

The classification of these POSs A can be carried out as such:

O: poor performances
XX: good performances
The results obtained are given in Table 4 below.

TABLE 4

| O | XX |
|---|---|
|   | 9 |
|   | 8 |
|   | 10 |
|   | 11 |
| 8 Comp. | 12 |

5) Application as an Emulsion
5.1. Methodology

The same substrate is used as for the application in a solvent and 700 ppm of fluorine are deposited (spraying a circular sample of polyamide carpet weighing 15 g using a spray gun) from emulsions. The carpet is subsequently subjected to drying for 6 minutes at 80° C. and then to a heat treatment for 4 minutes at 140° C. The emulsions are prepared from the POS A of Example 9 and two commercial products are tested under the same conditions as comparative examples. (They are the products AG 850 from Asahi and FC 396 from 3M, referenced respectively as Comp. Example 17 and Comp. Example 18).

5.2. Composition (as Weight %) for Examples 13 to 16

TABLE 5

| | Example No. | | | |
|---|---|---|---|---|
| Constituents | 13 | 14 | 15 | 16 |
| POS A = fluorosilicone Example No. 9 | 19.9 | 13.6 | 25.1 | 13.6 |
| Methyl isobutyl ketone | 14.9 | 28.9 | 22.3 | 10.2 |
| Acetic acid | 0.5 | 0.17 | 0.51 | 0.63 |
| Water | 64.7 | 41.8 | 50.2 | 41.8 |
| Genapol X050 | | 0.68 | | |
| Genapol X080 | | | 1.25 | 0.68 |

5.3. Soil-resistance Results

TABLE 6

| Example No. | OR | WR |
|---|---|---|
| 13 | 4 | 4 |
| 14 | 4 | 4 |
| 15 | 4 | 5 |
| 16 | 4 | 4 |
| Comp. 17 (Asahi) | 4 | 4 |
| Comp. 18 (3M) | 5 | 3 |

5.4. Evaluation of the Permanency

The permanency nature of the coating is demonstrated by several techniques.

Characterization of the contact angles on a polyamide PA 6-6 film before and after extracting with a solvent
Evaluation of the soil-resistant properties before and after washing on various substrates.

5.4.1. Contact Angle Measurements

The process for the preparation of the samples is as follows:

extraction of the PA 66 films with MeOH in a Soxhlet
drying for 48 h at 80° C.
coating with 1% solutions in freon by spin coating
drying for 4' at 140° C.
extraction with MeOH for 2 h in a Soxhlet (80° C.)
drying for 4' at 140° C.

The values for surface energy, which is calculated from the angles formed with diodomethane and water, are presented in the following Table 7.

TABLE 7

| | Surface energy (mN/m) | |
|---|---|---|
| Example No. | Before extraction | After extraction |
| 9 | 11.2 | 14.6 |
| 10 | 11.4 | 13.9 |
| Comp. 17 | 8 | 21 |

The values obtained before extraction correspond to surface energies for perfluorinated compounds. After extracting for 2 hours with methanol at 80° C., the coating is found to be permanent except in the case of Comp. Sample 17, which does not comprise acidic or HALS functional groups.

5.4.2. Evaluation of the Resistance to Washing

The evaluation is carried out on three types of substrate (polyamide microfibers, polyester or cotton). The application is carried out by spraying with a spray gun starting from the following emulsions, which are diluted, so as to deposit, in each case, 2 000 ppm of fluorine on the textile.

Comp. Example 21 and Comp. Example 22 are comparative examples of perfluorinated products for the treatment of textiles (3M). The emulsion is used as is (Comp. Example 21) and according to the recommendations of the supplier (Comp. Example 22).

The emulsion compositions for Example 19, Example 20, Comp. Example 21 and Comp. Example 22 are given in the following Table 8.

TABLE 8

| | Example No. | | | |
|---|---|---|---|---|
| Emulsion composition | 19 | 20 | 21, Comp. | 22, Comp. |
| Fluorosilicone No. 8, Comp. | 19 | | | |
| Fluorosilicone No. 9 | | 19.7 | | |
| Methyl isobutyl ketone | 14.8 | 14.8 | | |
| Acetic acid | | 0.5 | | 0.12 |
| Water | 65.2 | 64 | | 87.65 |
| Genapol X080 | 1 | 1 | | |
| FC251 (3M) | | | 100 | 2.13 |
| Quedocur FF (Thor) | | | | 8 |
| Magnesium chloride | | | | 2 |

The performances on three types of fabrics:

cotton: Table 9
PET/cotton: Table 10
Polyamide μfibers: Table 11 and are evaluated in the initial state, after 5 washing operations at 40° C. for 40 minutes and then after ironing.

TABLE 9

COTTON

| Example | Initial | | 5 washing operations | | 5 washing operations + ironing | |
|---|---|---|---|---|---|---|
| | OR | spray test | OR | spray test | OR | spray test |
| 19 | 2 | 50 | 0 | 0 | 0 | 0 |
| 20 | 5 | 70 | 2 | 50 | 4 | 50 |
| 21, Comp. | 3 | 90 | 1 | 50 | 0 | 50 |
| 22, Comp. | 6 | 90 | 0 | 50 | 0 | 50 |

TABLE 10

PET/COTTON

| Example | Initial | | 5 washing operations | | 5 washing operations + ironing | |
|---|---|---|---|---|---|---|
| | OR | spray test | OR | spray test | OR | spray test |
| 19 | 3 | 70 | 0 | 50 | 0 | 50 |
| 20 | 5 | 70 | 4 | 50 | 5 | 70 |
| 21, Comp. | 5 | 100 | 1 | 70 | 2 | 80 |
| 22, Comp. | 6 | 80 | 0 | 70 | 4 | 70 |

TABLE 9

POLYAMIDE μFIBERS

| Example | Initial | | 5 washing operations | | 5 washing operations + ironing | |
|---|---|---|---|---|---|---|
| | OR | spray test | OR | spray test | OR | spray test |
| 19 | 3 | 50 | 0 | 0 | 0 | 50 |
| 20 | 5 | 70 | 2 | 50 | 0 | 50 |
| 21, Comp. | 6 | 100 | 3 | 70 | 6 | 100 |
| 22, Comp. | 6 | 100 | 0 | 70 | 6 | 80 |

What is claimed is:

1. Method for forming a hydrophobic and/or oleophobic coating and/or impregnation with low surface energy on a substrate, comprising depositing onto the substrate at least one perfluorinated polysiloxane POS A and optionally at least one functional additive B wherein the POS A carries, per molecule:

one or more perfluorinated Gf grafts, which are identical to or different from one another, of formula:

$$\equiv(CH_2)_{\overline{m}}-CR^1 \begin{matrix} [C(R^1)_2]_{\overline{n}}-\overset{O}{\underset{\|}{C}}-O-Rf_1 \\ \diagdown \\ C-O-Rf_2 \\ \| \\ O \end{matrix} \quad (I)$$

in which:
m=1–10 and n=0–4;
the $R^1$ radicals independently represent hydrogen or a $C_1$–$C_6$ alkyl and $Rf_1$ and $Rf_2$ are perhalogenated, one or more attaching radicals carrying at least one amine functional group $f_{a1}$, and one or more $G_{alk}$ groups, which are identical to or different from one another, of formula (V):

$$\equiv(CH_2)_{m''}-CR^{12} \begin{matrix} [C(R^{12})_2]_{n''}-\overset{O}{\underset{\|}{C}}-O-Rh^1 \\ \diagdown \\ C-O-X \\ \| \\ O \end{matrix} \quad (V)$$

in which:
$R^{12}$, m'', n'' correspond, respectively, to $R^1$, m and n, and $Rh^1$ is a linear or branched alkyl radical, and
X corresponds to an $Rh^1$ radical or to hydrogen or alternatively to a hydrocarbonaceous radical other than $Rh^1$.

2. Method according to claim 1, wherein $f_{a1}$ comprises a sterically hindered piperidinyl group or derivative thereof.

3. Method according to claim 1, wherein the POS A comprises at least one other functional radical $f_a$ selected from the group consisting of:
radicals carrying at least one epoxy functional group $f_{a2}$;
radicals carrying at least one (poly)ether functional group $f_{a3}$;
radicals carrying at least one carboxyl functional group $f_{a4}$; and
mixtures thereof.

4. Method according to claim 1, wherein $Rf_1$ and $Rf_2$ are linear or branched perfluoroalkyl radicals of formula:

$$-C_qF_{2q}-CF_3 \text{ with } q>/0; \quad (II)$$

or $$-C_qF_{2q}-H \text{ with } q>/1; \quad (III)$$

in which m=1 to 10, and n=0 to 4.

5. Method according to claim 1, wherein the alkyl groups $G_{alk}$ are branched and each comprises between 10 and 20 carbon atoms.

6. Method according to claim 1, wherein the POS A carries, per molecule, one or more perfluorinated Gfh grafts, which are identical to or different from one another, of formula (I.1):

$$\equiv(CH_2)_{m'}-CR^{11} \begin{matrix} [C(R^{11})_2]_{\overline{n'}}-\overset{O}{\underset{\|}{C}}-O-Rf_3 \\ \diagdown \\ C-O-Rh \\ \| \\ O \end{matrix} \quad (I.1)$$

in which:
$R^{11}$, $Rf_3$, m' and n' correspond to $R^1$, $Rf_1$, m and n, respectively; and
Rh is a linear or branched alkyl radical.

7. Method according to claim 1, wherein Rh is a linear $C_6$–$C_{20}$ alkyl radical.

8. Method according to claim 1, wherein the POS A carries, per molecule, one or more carboxyl attaching functional radicals $Fa_4$ of formula (IV):

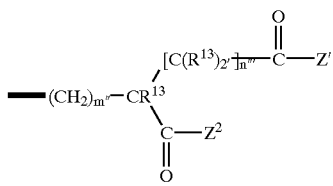

(IV)

in which:
R$^{13}$, m''' and n''' correspond to R$^1$, m and n respectively; and
Z$^1$ and Z$^2$ correspond to —OH or together form an —O— bridge.

9. Method according to claim 1, including at least one POS A group corresponding to formula (VI):

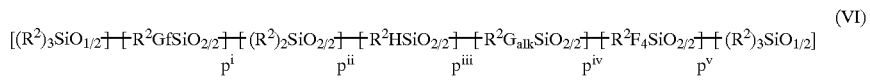

(VI)

in which:
Gf and F$_a$ are independently and respectively, perfluorinated grafts and radicals carrying f$_{a1}$ functional groups;
R$^2$ groups are identical to or different from one another, and are methyl, propyl or butyl;
G$_{alk}$ groups are identical to or different from one another, and are branched alkyl,
$0<p^i$,
$0 \leq p^{ii}$,
$0 \leq p^{iii}$,
$0<p^{iv}$,
$0<p^v$, and
$\Sigma p^{i \, to \, v}+2=5$ to 600.

10. Method according to claim 1, wherein in formula (VI):
G$_{alk}$ groups are identical to or different from one another, and are C$_6$–C$_{20}$ alkyl;
$1 \leq p^i \leq 100$;
$0 \leq p^{ii} \leq 500$;
$0 \leq p^{iii} \leq 10$;
$0<p^{iv} \leq 100$;
$0<p^v \leq 100$;
$\Sigma p^{i \, to \, v}+2=10$ to 400.

11. Method according to claim 1, wherein the POS A comprises, in addition to M and D siloxyl units, T and optionally Q siloxyl units.

12. Method according to claim 1, wherein POS A is obtained from POS groups selected from the group consisting of polyalkylhydrosiloxanes, the SiH units of the POS groups subsequently being at least partially used for hydrosilylation of olefinic precursors of all or a portion of Gf, Fa and G$_{alk}$ grafts;
in the presence of an effective amount of metal hydrosilylation catalyst.

13. Method according to claim 12, wherein the metal hydrosilylation catalyst is based on platinum.

14. Perfluorosilicone composition comprising at least one POS A carrying, per molecule:

one or more perfluorinated Gf grafts, which are identical to or different from one another, of formula:

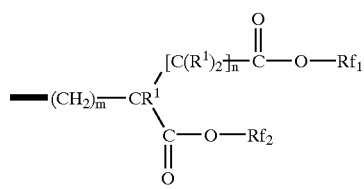

(I)

in which:
m=1–10 and n=0–4;
the R$^1$ radicals independently represent hydrogen or a C$_1$–C$_6$ alkyl group;
Rf$_1$ and Rf$_2$ are linear or branched perfluoroalkyl radicals of formula:

—C$_q$F$_{2q}$—CF$_3$ with q>/0;   (II)

or

—C$_q$F$_{2q}$—H with q>/1;   (III)

one or more attaching functional radicals Fa, which are identical to or different from one another, chosen from radicals carrying at least one sterically hindered piperidinyl group and its derivatives; and
one or more linear or branched alkyl groups G$_{alk}$ group, which are identical to or different from one another, of formula (V):

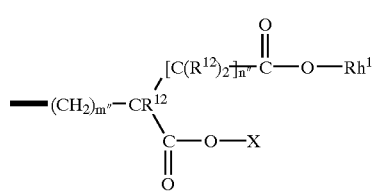

(V)

in which:
R$^{12}$, m'', n'' and Rh$^1$ correspond to R$^1$, m and n, respectively, and Rh$^1$ is a linear or branched alkyl radical, and
X is an Rh$^1$ radical or hydrogen or alternatively a hydrocarbonaceous radical other than Rh$^1$.

15. Composition according to claim 14, wherein POS A comprises at least one radical selected in the group consisting of:
radicals carrying at least one epoxy functional group f$_{a2}$;
radicals carrying at least one (poly)ether functional group f$_{a3}$;
radicals carrying at least one carboxyl functional group f$_{a4}$; and
mixtures thereof.

16. Composition according to claim 15, comprising at least one functional additive B and/or at least one catalyst C capable of promoting the reaction of the attaching functional groups $f_{a1}$ to 4 with a substrate on which said composition is to be applied.

17. Process for the preparation of hydrophobic and/or oleophobic coatings and/or impregnations on a substrate, consisting essentially of:

preparing and/or employing a composition according to claim 14, optionally containing a solvent, applying said composition to a substrate, so as to obtain a film and/or to impregnate the substrate, and optionally evaporating the solvent, if present.

18. Coating precursor, coating, paint or glaze, comprising a composition according to claim 14.

* * * * *